INVENTOR.
FORREST E. BROOKS
BY
W. H. Sprouse
Attorney

INVENTOR.
FORREST E. BROOKS
BY
[signature]
Attorney 3,177,396
DYNAMIC FOCUS CIRCUIT

Forrest E. Brooks, Moorestown, N.J., assignor to Radio Corporation of America, a corporation of Delaware Filed Apr. 2, 1962, Ser. No. 184,088
8 Claims. (Cl. 315—31)

This invention relates to circuits for providing a dynamically varying focus voltage or wide angle electrostatically focussed cathode ray tubes and particularly to circuits for providing a dynamically varying focus voltage that is especially useful in cathode ray tubes requiring a deflection angle of 135° or more.

In wide angle cathode ray tubes, some objectionable defocussing of the electron beam may result near the side edges of the picture due primarily to increased length of the electron beam path between the center of deflection thereof and the phosphor coating of the picture tube upon deflection of the beam from its central to its extreme, deflected positions. Therefore, it is often a practice to vary the focussing voltage, which is applied to the focussing electrode of the cathode ray tube during each deflection of the cathode ray beam to provide proper focus during deflection thereof. A voltage which varies through its cycle once during each deflection of the electron beam is developed in the horizontal deflection circuit. This voltage may be modified to provide satisfactory dynamic focussing voltage.

It is an object of this invention to provide a circuit for producing the required voltage and wave form to be applied to the focussing electrode of a cathode ray tube to maintain proper focus of the beam thereof during deflection of the beam, said voltage being taken from the deflection circuit.

It is an object of this invention to provide an improved circuit for producing the required focussing voltage and wave form for wide angle deflection of cathode ray tubes.

This invention includes circuit means for taking a voltage from a point, or between points, in the deflection circuit of a cathode ray tube and for so modifying the voltage as to provide a focussing voltage for wide angle cathode ray tubes.

The invention is described in connection with accompanying drawings wherein.

Figure 4:
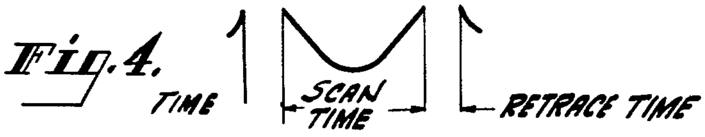
FIG. 4 shows the wave form of a voltage suitable for dynamic electrostatic focussing, plotted against time; and, FIGS. 5 to 8 show wave forms of voltages, plotted against time, appearing in the circuits of FIGS. 1 to 3.

In wide angle deflection cathode ray tubes, particularly 135° or more, the electron beam may be properly focussed on the phosphor in some of its deflected positions and out of focus in others of its positions. One manner of electrostatically focussing a beam is to apply a proper focussing voltage to the focussing electrode of a cathode ray tube. Therefore, wide deflection angle cathode ray tubes often employ a changing or dynamic focus voltage during the deflection of the beam. Since the horizontal deflection angle of the beam is greater than the vertical deflection angle, varying focussing voltages that are sufficient to provide focussing during the horizontal deflection of the beam are generally sufficient to provide proper focus correction during all deflections of the beam. The voltage wave desired for application to the focussing electrode of a wide deflection angle cathode ray tube should be in the form of a parabola having a vertical axis and opening upwards, as shown in FIG. 4. A voltage swing of up to about 800 volts between maximum positive potential and minimum positive potential values thereof may be necessary, although lesser voltage swings may be sufficient to produce acceptable dynamic focussing in wide angle cathode ray tubes. The maximum positive values of focussing voltage occurs when the beam is at the sides of its raster, the focussing voltage varying once through its range with each deflection of the beam between its extreme positions.

A voltage that varies through its range once during each complete horizontal deflection of the beam may be taken from the circuit for producing deflection currents for the horizontal coils of the deflection yoke of the cathode ray tube. In wide angle horizontal deflection circuits, the desired yoke current wave form to provide horizontal deflection with good horizontal linearity is more nearly of cosine than pure sawtooth shape. The desired yoke current wave form is often produced, in a known manner, by inserting a linearizing capacitor in series with the horizontal deflection coils to render the coils and the capacitor series resonant at a frequency below the 15,750 cycles per second scanning frequency. The inventor has found that a voltage taken from the juncture of the linearizing condenser and the horizontal yoke coils, upon proper modification as described below is especially useful for dynamic focussing.

Figures 1, 2, 3:
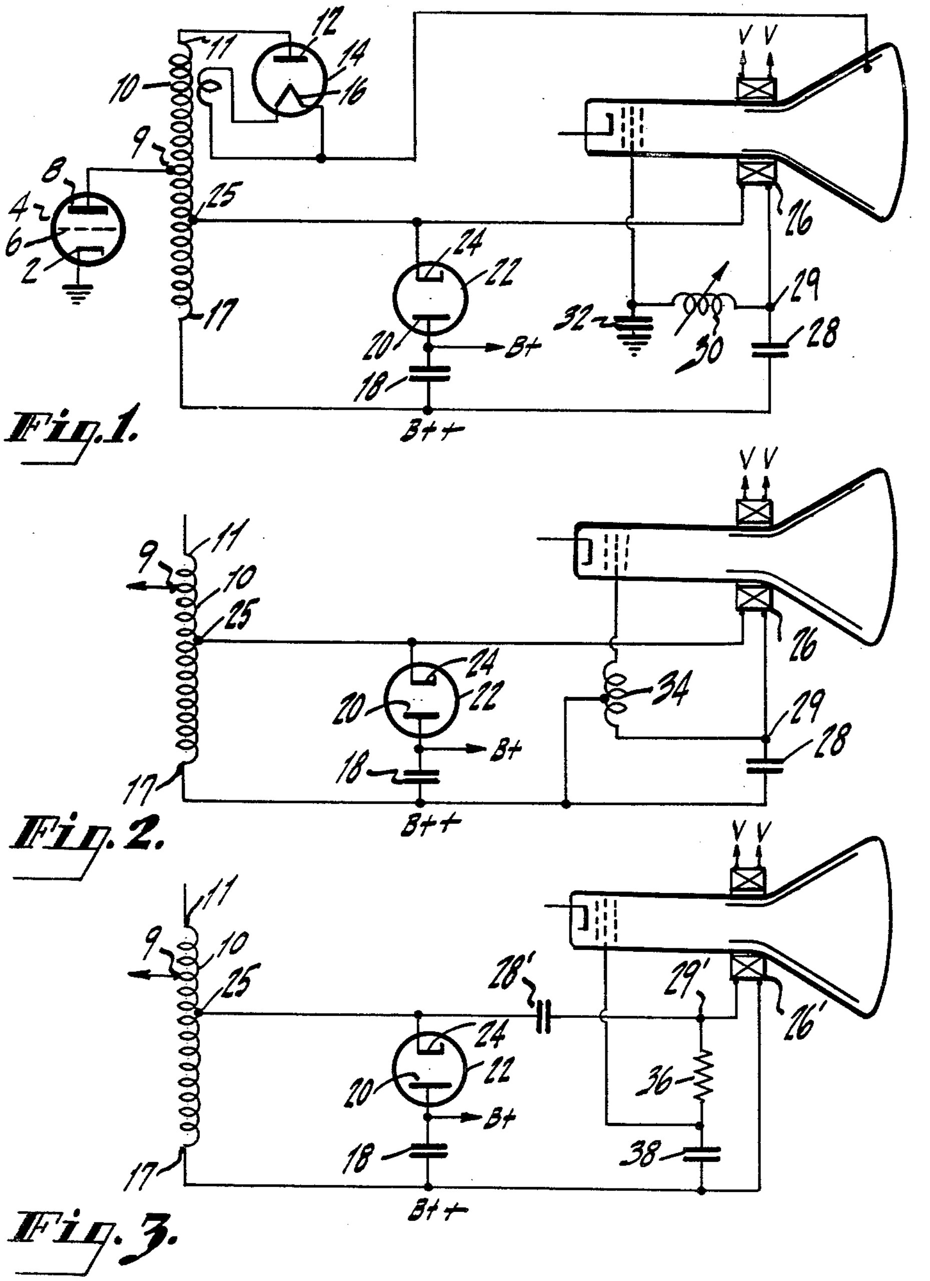
FIG. 1 illustrates a circuit embodying a preferred form of this invention.
FIGS. 2 and 3 illustrate circuits including modified embodiments of this invention.

FIG. 1 illustrates a circuit including a preferred embodiment of this invention. In FIG. 1, the cathode 2 of the horizontal deflection output tube 4 is grounded, and a required driving voltage of modified sawtooth shape is applied to the grid 6 of the tube 4. The anode 8 of this tube is conductively connected to a tap 9 on the output transformer coil 10. One end 11 of coil 10 is connected to the anode 12 of the high voltage rectifier 14, and the cathode 16 thereof is connected to the Ultor, or electrode system of the cathode ray tube to which the high voltage is applied, as indicated in FIG. 1. The other end 17 of coil 10 is connected through a B-boost condenser 18 to the anode 20 of the damping tube 22. The cathode 24 of the damping tube 22 is connected to a second tap 25 on coil 10, this tap 25 being between the end 17 of the coil 10 and the tap 9 thereon. Positive voltage (B+) is applied to the anode 20 of the damping tube 22, as indicated. B-boost voltage may be derived from the juncture B++ of condenser 18 and coil 10. Horizontal yoke coils 26 are connected in series with linearizing condenser 28 between the tap 25 and the end 17 of coil 10.

Figure 5:
Figure 6:

The circuit so far described is known, and besides providing high voltage for the picture tube and B-boost voltage, as noted above, it also provides deflection currents for the horizontal yoke coils, of a proper wave form for wide angle deflection cathode ray tubes. As noted above, the linearizing condenser 28 is provided due to the requirement of a nearly cosine current wave in the horizontal deflection coils. The voltage appearing between the juncture 29 of the yoke coil 26 and the condenser 28 and a point of lower potential in the circuit, such as ground, is of a shape shown in FIG. 5. This voltage wave is of generally sine shape, but, for practical purposes it resembles the parabolic curve during line-scanning intervals sufficiently, and its voltage is sufficiently high to be useful for dynamic focussing. However, the polarity of this wave is reversed from the proper one. According to this invention, this voltage appearing at junction 29 is adapted to provide the required dynamic wave form for focussing. To provide a reversed polarity voltage wave and to provide adjustment of the voltage wave amplitude, variable inductor 30 and condenser 32 are connected in series between the juncture 29 and ground. This series circuit is series resonant at a frequency below the horizontal scanning frequency of 15,-750 cycles per second. In a preferred embodiment, the variable inductance 30 is variable about a value of about 220 millihenries and the capacitor 32 has a value of about 560 micromicrofarads. The focussing voltage is taken from the common connection of the inductance 30 and the capacitor 32 and, as shown in FIG. 6, is of proper polarity and close enough to the required parabolic shape to provide a dynamic focussing voltage capable of producing good beam focussing. The voltage can be varied without significant change in wave form by adjusting the value of inductance 30, and the voltage is increased as the tuned circuit 30, 32 approaches resonance at 15,750 cycles per second.

FIG. 2, which includes another embodiment of this invention, is identical with FIG. 1, except that in FIG. 2 the focussing voltage is obtained from the juncture 29 by means of an auto-transformer 34. Therefore, a detailed description of the entire circuit of FIG. 2 is not necessary. The same reference characters are used in FIGS. 1 and 2 to indicate the same elements arranged in the same relative positions.

Focussing voltage is taken from juncture 29 of FIG. 2 by means of the auto-transformer coil 34. One end of coil 34 is connected to juncture 29. A tap on coil 34 is connected to a point of different potential in this circuit such as the other terminal of condenser 28. The remaining end of coil 34, at which a proper wave form for dynamic focussing is developed, is connected to the focussing electrode of the cathode ray tube. Since the tap on auto-transformer coil 34 is at lower alternating potential than the end connected to junction 29, the volttage appearing at the junction 29 is reversed in polarity and stepped up in voltage by auto-transformer 34.

A third embodiment of this invention is shown in FIG. 3. In FIG. 3, the linearizing condenser 28' is connected between the tap 25 on coil 10 and the horizontal yoke coil 26', while the other end of yoke 26' is connected to the end 17 of the coil 10. The rest of this circuit, except for elements 36 and 38 which are referred to below, are connected like the similar elements having the same reference characters appearing in FIGS. 1 and 2 and therefore no further description of these similar elements appears necessary.

Figure 7:
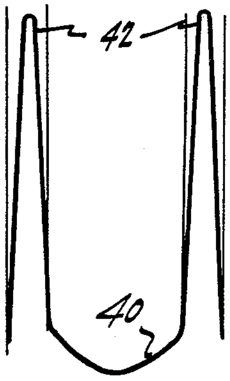
Figure 8:
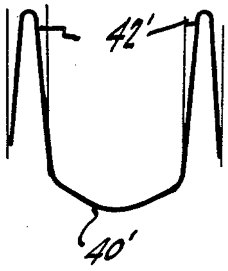

In FIG. 3, the voltage at the junction 29' between horizontal deflection coil 26' and linearizing condenser 28' takes the shape of a parabola properly poled, as shown at 40 of FIG. 7, and of high enough voltage to provide useful dynamic focussing. However, the flyback pulse 42, the wave shape of which is shown in FIG. 7, which exists across the yoke 26' during retrace intervals also appears at this junction 29'. These pulses 42, being of about 4,000 volts, are so high in voltage that if applied to the focussing electrode, the cathode ray tube may be injured or even destroyed. An integrating circuit, comprising resistor 36 and condenser 38 connected in series from junction 29' to a point of different potential in the circuit such as the other connection of the yoke 26', reduces the magnitude of the pulses, as shown at 42' of FIG. 8 to the point where the pulse 42' will not do harm to the cathode ray tube. This integrating circuit 36, 38 reduces the parabolic voltage to a lesser degree as shown at 40' of FIG. 8. The voltage 40', appearing at the common connection of resistor 36 and condenser 38, which is useful for dynamic focussing in accordance with this invention, is applied to the focussing electrode of the cathode ray tube. It will be noted that this embodiment of the invention uses a resistor and a condenser, but no coil, in addition to the known elements of the deflecting circuit for wide angle deflection tubes.

What is claimed is:

1. In a circuit for providing a focussing voltage for a focussing electrode of a cathode ray tube, in combination, deflection means for deflecting the electron beam in the cathode ray tube, said deflection means including a deflection winding and means for generating deflection currents for said windings;

a capacitor connected in series between said means for generating deflection currents and said deflection winding thereby providing a juncture between said winding and one terminal of said capacitor, said capacitor being charged and discharged by said deflection currents so as to provide a said juncture a voltage which varies with the angle of deflection of the electron beam;

and impedance means connected between said one terminal of said capacitor and the focussing electrode of the cathode ray tube for modifying said voltage and applying said modified voltage to the focussing electrode.

2. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a capacitor having its first terminal connected to said low potential end of said generating means and having its second terminal connected to said deflection winding, said capacitor being charged and discharged by said deflection currents so as to provide at said second terminal thereof a voltage which varies with the angle of deflection of the electron beam;

and impedance means connected between the second terminal of said capacitor and the focussing electrode of the cathode ray tube for modifying said voltage and applying said modified voltage to the focussing electrode.

3. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a capacitor having a first terminal connected to said high potential end and having a second terminal connected to said deflection winding, said capacitor being charged and discharged by said deflection currents so as to provide at said second terminal of said capacitor a voltage which varies with the angle of deflection of the electron beam;

and impedance means connected between the second terminal of said capacitor and the focussing electrode of the cathode ray tube for modifying said voltage and applying said modified voltage to the focussing electrode.

4. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a capacitor having a first terminal connected to said high potential end and having a second terminal connected to said deflection winding, said capacitor being charged and discharged by said deflection currents so as to provide at said second terminal of said capacitor a voltage which varies with the angle of deflection of the electron beam;

and integrating means connected between the second terminal of said capacitor and the focussing electrode of the cathode ray tube for integrating said voltage and applying said integrated voltage to the focussing electrode.

5. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a first capacitor having a first terminal connected to said high potential end and having a second terminal connected to said deflection winding, said capacitor being charged and discharged by said deflection currents so as to provide at said second terminal of said capacitor a voltage which varies with the angle of deflection of the electron beam;

a network including a resistor and a second capacitor connected in series, said network being connected between said second terminal of said first capacitor and said low voltage end of said generating means for integrating the voltage appearing at said second terminal; and means for applying the integrated voltage of said network to the focussing electrode of the cathode ray tube.

6. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a capacitor having a first terminal connected to said low potential end of said generating means and having a second terminal connected to said deflection winding, said capacitor being charged and discharged by said deflection currents so as to provide at said second terminal a voltage which varies with the angle of deflection of the electron beam;

and impedance means connected between said second terminal of said capacitor and the focussing electrode of the cathode ray tube for inverting the voltage appearing at said second terminal of said capacitor and applying said inverted voltage to the focussing electrode.

7. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a capacitor having a first terminal connected to said low potential end of said generating means and having a second terminal connected to said deflection winding, said capacitor being charged and discharged by said deflection currents so as to provide at said second terminal a voltage which varies with the angle of deflection of the electron beam;

and a tapped inductor having one end thereof connected to said second terminal of said capacitor and the other end thereof connected to the focussing electrode, a tap of said tapped inductor being connected to said first terminal of said capacitor whereby said tapped inductor inverts the voltage appearing at said second terminal of said capacitor and applies the inverted voltage to the focussing electrode.

8. In a circuit for providing a focussing voltage for a focussing electrode of a cathode ray tube, in combination, deflection means for deflecting the electron beam in the cathode ray tube, said deflection means including a deflection winding and means for generating deflection currents for said winding, said generating means having a high potential end and a low potential end;

a first capacitor having its first terminal connected to said low potential end of said generating means and its second terminal connected to said deflection winding, said capacitor being charged and discharged by said deflection currents so as to provide at said second terminal a voltage which varies with the angle of deflection of the electron beam;

a network including a variable inductor and a second capacitor in series, the free end of said inductor being connected to said second terminal of said first capacitor and the free end of said second capacitor being connected to ground potential; and means connecting the junction point between said variable inductor and said second capacitor of said network to the focussing electrode of said cathode ray tube whereby said network inverts the polarity of the voltage appearing at said second terminal of said first capacitor and applies the inverted voltage to the focussing electrode.

References Cited in the file of this patent

UNITED STATES PATENTS 2,628,326 Bridges ---------------- Feb. 10, 1953